No. 674,825. Patented May 21, 1901.
A. DE CASTRO.
APPARATUS FOR ACCUMULATING AND STORING ENERGY.
(Application filed Apr. 10, 1900.)

(No Model.) 2 Sheets—Sheet 1.

Witnesses:
Sidney P. Collingsworth
Julia M. Powel

Inventor:
Angel de Castro,
by Dodge and Sons
Attorneys

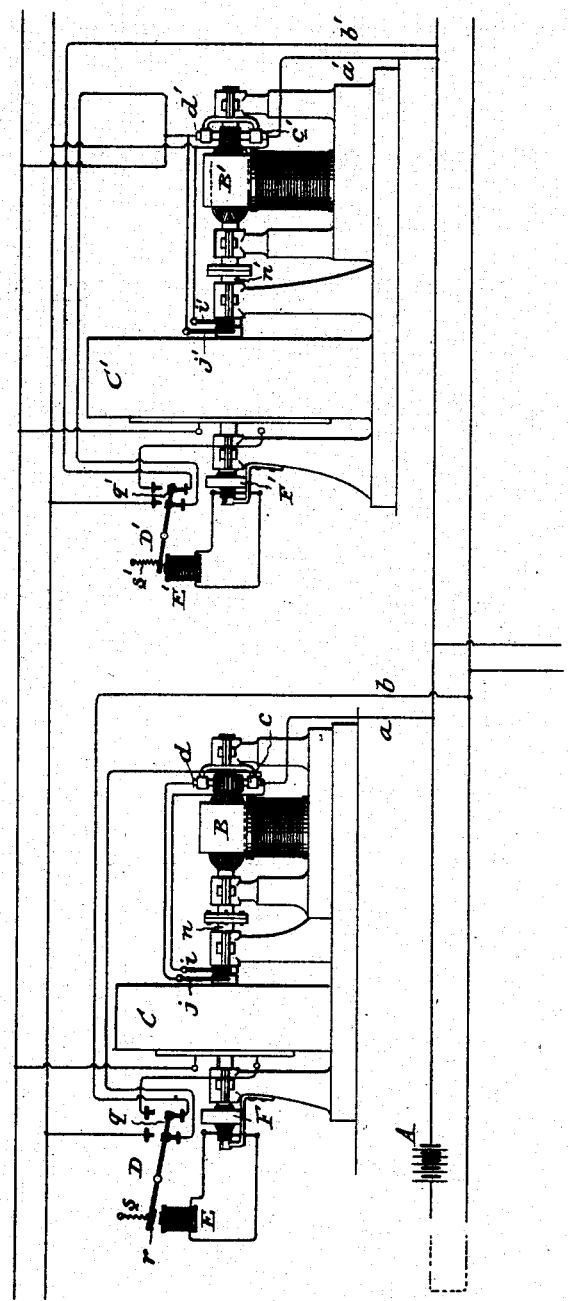

UNITED STATES PATENT OFFICE.

ANGEL DE CASTRO, OF NEW YORK, N. Y., ASSIGNOR OF ONE-HALF TO HENRY W. SCHLOMANN, OF SAME PLACE.

APPARATUS FOR ACCUMULATING AND STORING ENERGY.

SPECIFICATION forming part of Letters Patent No. 674,825, dated May 21, 1901.

Application filed April 10, 1900. Serial No. 12,363. (No model.)

*To all whom it may concern:*

Be it known that I, ANGEL DE CASTRO, a citizen of the United States, residing at New York, in the county of New York and State of New York, have invented certain new and useful Improvements in Apparatus for Accumulating and Storing Energy, of which the following is a specification.

This invention relates to apparatus for accumulating or storing up energy derived through the relatively-prolonged operation of a comparatively small motor or source of power preparatory to utilization of the stored energy for a brief period in a motor of greater power to perform work which the smaller motor would be incapable of performing directly.

The invention contemplates the use of the familiar fly-wheel as a means of storing up energy, but introduces in connection therewith novel means for building up, transforming, applying, and controlling the stored energy, whereby it may be utilized to the best advantage.

The accompanying drawings represent apparatus embodying my invention.

Figure 1:
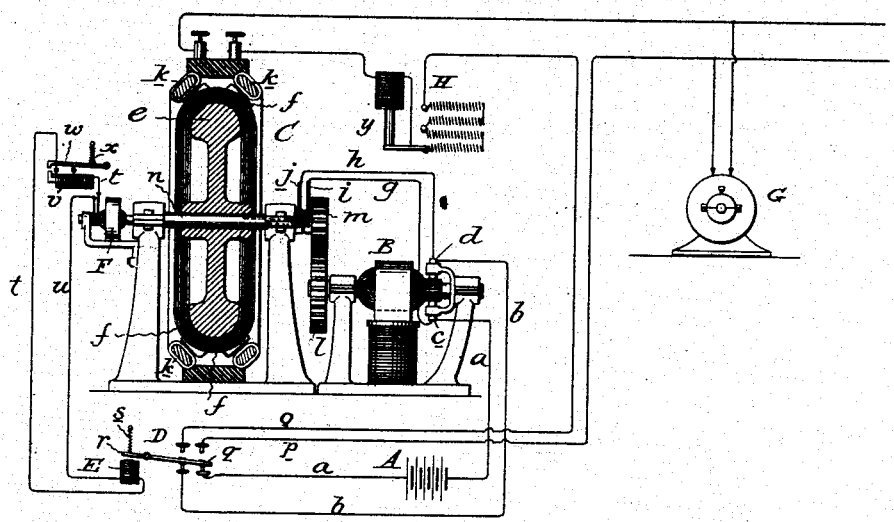
Figure 2:
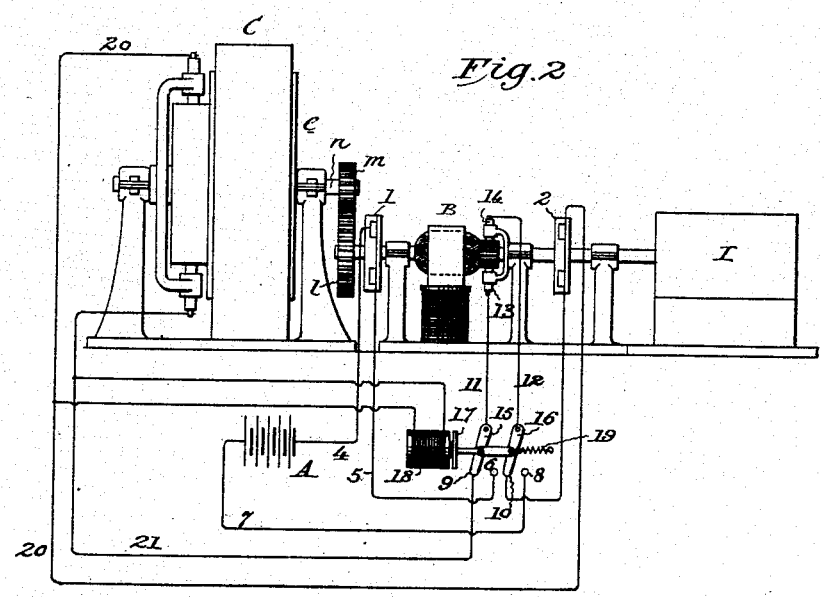

Figure 1 is an elevation, partly in section and of a diagrammatic character, showing the apparatus in its simplest form; Fig. 2, a similar elevation, but not in section, showing a modified arrangement of the apparatus; Fig. 3, a view illustrating the invention embodied in apparatus adapted to progressively build up the accumulated power to a point beyond that practicable with the single apparatus of Figs. 1 and 2.

It is of course well understood that the energy exerted by a relatively small motor operating for a comparatively long time may be stored up either in a heavy fly-wheel or in other ways and recovered or used to impart motion to other apparatus and that in this way a force greater than that which the first motor is capable of exerting at any given moment may be obtained and utilized for a brief period of time.

There are many situations in which it is desirable to exert for relatively short periods a great force, but where it is impracticable for one or another reason to employ and keep in operation a motor capable of giving constantly such relatively great power. It is to meet this requirement that the present invention is designed. Instances of this character are presented in the case of vehicles, which at starting require the application of relatively great power but which once under way may be kept in motion and at proper speed by the expenditure of relatively little power. Other fields in which this requirement is presented are offered in self-propelling torpedoes, rolling machinery, and the like.

Briefly stated, my invention consists, essentially, in converting the electric energy of any convenient source of electricity into kinetic energy by delivering it into a motor, which, being at the time without load, gradually increases its speed until the maximum attainable with a given electric energy or until a predetermined speed is reached. When such kinetic energy is attained, the motor is electrically disconnected from its source of supply and another electric circuit is established, in which is included a dynamo-electric generator impelled by the energy stored up through the action of the first motor and which dynamo transforms the stored energy into electric energy and delivers the same to the translating device requiring for a brief period the relatively high power or energy. This translating device may be another motor, a heating-coil, a sparking device, or other.

By properly proportioning the parts or adjusting their ratios the period of accumulation may be made as long and the period of discharge or reconversion as short as desired for any given application.

Referring first to Fig. 1, A indicates a source of electrical energy, which is here conventionally represented as a primary battery, but which may equally well be a storage battery, a dynamo-electric generator driven by any suitable prime motor, or other source of electric supply. The terminals of the source A are connected by conductors $a\ b$ with the brushes $c\ d$ of an electric motor B of any suitable type.

C indicates what for convenience I designate an "electromechanical accumulator," comprising a heavy fly-wheel $e$, rotating within the coils $k$ of a fixed encircling armature and wound in any well-known way with pole-producing coils, as $f$, which are supplied at proper times with an electrical current through conductors $g$ $h$ and brushes $i$ $j$, the latter bearing upon a commutator-cylinder carried by the shaft of the electromechanical accumulator C, the conductors $g$ and $h$ being in turn connected with the brushes $c$ and $d$ of the motor B, as shown. It will be readily understood that if the coils $k$ be properly closed and the winding $f$ be electrically excited the apparatus C will, when the wheel $e$ is rapidly rotated, become an alternating-current generator. So long, however, as the coils $k$ are open—that is to say, so long as there is no complete circuit through them and back—the wheel $e$ will rotate without retardation by the armature and without generating any current in said coils. Connection is made between the wheel $e$ and the shaft of the motor B by gears $l$ $m$, the larger of which is secured upon the shaft of the motor B, as indicated. As a consequence of this arrangement the shaft $n$ of the fly-wheel $e$ will make more turns than will the shaft of the motor B, and the wheel $e$ will consequently be driven at relatively high speed, the peripheral speed being enhanced by reason of the relatively large diameter of said wheel.

D indicates a switch or circuit-closer designed to open or break the circuit comprising the source A, conductors $a$ $b$, and motor B, and to simultaneously close a second circuit comprising or including conductors $o$ $p$, armature-coils $k$ of the electromechanical accumulator C, and a motor or other translating device G. This switch is represented as a simple lever pivoted at a point between its ends and carrying at one end a conducting plate or bar $q$ to bridge two separated contacts and at the opposite end an armature $r$, of soft iron, adapted to be attracted by an electromagnet E when the latter is energized. A small spring $s$ serves to hold the armature away from the pole of the magnet when the latter is deënergized and to maintain the switch or circuit-closer in the position shown in Fig. 1, where it is represented as closing or completing the supply-circuit of the motor B.

F indicates a small dynamo-electric generator, the armature of which is carried by the shaft $n$ of the electromechanical accumulator C and the current supplied by which is delivered to a circuit formed by the conductors $t$ $u$ and the winding of the electromagnet E. The purpose of the generator F is to energize the magnet E; but as it is not desirable to bring said magnet into action or to cause it to break the supply-circuit of the motor B until the fly-wheel $e$ attains a predetermined and very high speed a resistance $v$ is introduced into the conductor $t$. Said resistance is in the form of a coil wound about a soft-iron rod or bar having a free pole, which upon the passage of a predetermined current serves to attract a short-circuiting armature $w$, which bridges two contacts of the resistance and short-circuits a section thereof. The armature having, however, been brought by the full strength of the magnet close to the magnet-pole and being within the strong field of attraction thereof will be held by the magnet after such short-circuiting until the energizing-current itself is appreciably weakened.

The armature $w$ is normally held away from the magnet-pole by a light spring $x$ or in any other convenient way.

The apparatus being constructed as above described and the parts being adjusted to the position shown in Fig. 1, the operation will be as follows: Current being supplied to the motor B from the source A will put said motor in motion, and it, acting through the gearing $l$ $m$, will impart motion to the fly-wheel $e$. This wheel being free to turn without other resistance than that of friction will after a time acquire a high velocity. During this speeding of the wheel $e$ the coils $k$ of the fixed encircling armature are open by reason of the switch D being moved away from the contact of the conductors $o$ $p$ and to position to bridge those of the conductors $a$ $b$. As the wheel $e$ attains a predetermined or maximum speed the armature of the generator F likewise attains its predetermined or maximum speed and sufficiently energizes the electromagnet of which resistance $v$ constitutes the energizing-coil to attract the short-circuiting armature $w$, and thereby to cut out a portion of the resistance and to throw a greater current into the coil of electromagnet E. This action causes the armature of switch D to be strongly attracted and to open the supply-circuit of motor B and to close the circuit $o$ $p$, in which are included the armature-coils of the electromechanical accumulator. The motor B being now without an operating or propelling current, but being driven by reason of its gear connection with the rapidly-rotating fly-wheel $e$, becomes an electric generator, the current from which is led by the brushes $c$ $d$, conductors $g$ $h$, and brushes $i$ $j$ to and through the coils $f$ of the fly-wheel $e$. The rotation of this wheel with its coils $f$, energized by the current of the motor B, now running as a generator, said coils traveling within the coils or windings $k$ of the fixed armature, the apparatus becomes as a whole a generator of electric current, which is delivered through the conductors $o$ $p$ to the motor or other translating device G in whole or in part. The rapid rotation of the wheel $e$ with the parts constructed and arranged as described enables it to afford for a brief period a large output of electrical energy, the winding, of course, determining the electromotive force, volume, &c. If the purpose be to produce great heating capacity, then the winding will be, according to well-known formula, for great volume and relatively low electromotive force; but by proper and well-understood construction of the armature, the windings, &c., high electromotive force and small volume may be secured. It is of course well understood that if the full current be instantaneously thrown into a translating device, or at least into some forms of translating device, a burning out of the latter is likely to result. To guard against such contingency, I may introduce into the circuit $o\,p$ a rheostat or variable-resistance device H of any suitable form, adapted to be gradually withdrawn from the circuit, and consequently to permit the full current to be applied only progressively or gradually. In the drawings this resistance device is represented as comprising a series of resistance-coils with separate contacts at different points in the series and a short-circuiting plate or bridge carried by the movable core $y$ of the electromagnet and adapted to bridge the space between any of said contacts and the winding of the magnet, a terminal of such winding being left exposed or bare for the purpose. Any suitable form of variable resistance may, however, be employed. The movement of the core of the magnet is naturally somewhat gradual and may be retarded as required by any of the usual appliances to that end, such as dash-pots, governors, and the like. Where the current supplied by the accumulator acting as a generator is in excess of that required for the particular translating device, the surplus may be utilized for other purposes—for instance, to aid in maintaining for a longer time the speed of the wheel $e$.

It will be understood, of course, that the action of the accumulator C as a generator will necessarily be for a comparatively short period and that as the speed of the fly-wheel decreases the output of generator F will correspondingly decrease until a point is reached where the bridging-armature $w$ will no longer be held by its attracting-pole and will move away from the short-circuiting contacts of the resistance $v$. This will so far reduce the current delivered to electromagnet E as to render the latter incapable of longer holding the switch D in position to close the circuit $o\,p$, said switch thereupon opening said circuit and closing the supply-circuit of the motor B, which through the change of connections immediately becomes again a motor. All the parts in turn resume their normal positions, or those indicated in Fig. 1, and the whole series or cycle of operations is repeated. In this manner I am enabled, with a comparatively small motor and relatively feeble source of supply, to build up and apply for a brief period a relatively great energy, capable of performing for an instant or for a short period of time work which the motor or the original supply of electric energy would be incapable of performing.

In Fig. 2 I have represented a different embodiment of the same general plan. In this the motor B is employed both to impart the necessary speed to the fly-wheel in the first instance and to propel or give motion to the device requiring to have imparted to it for a brief period higher speed than could be given it by the motor when supplied from the primary source direct. In this construction B represents the motor, as before, the shaft of which is provided with two electromagnetic couplings 1 and 2, by which the shaft may be coupled or connected either with the gearing $l\,m$, through which motion is imparted to the shaft $n$ of fly-wheel $e$, and consequently to said wheel, or to a shaft 3 of a translating device I. A indicates the battery or other primary source of electric energy, and 4 and 5 conductors leading from one pole of the battery or source A to and from the electromagnetic clutch 1 and thence to a contact-stud 6. The other pole of the battery or source is connected by a conductor 7 with a terminal 8. Alternating in location or arrangement with the contacts 6 and 8 are other contacts 9 and 10. 11 and 12 are conductors leading to the respective brushes 13 and 14 of the motor B and having attached to their other ends movable contact members 15 and 16, which are connected to move in unison and are designed to connect the brushes 13 and 14 of the motor with the contacts 6 and 8 or the contacts 9 and 10, the former when it is desired to supply the motor with current from the primary source A and the latter when it is desired to supply it with current from the electromechanical accumulator C. The connected contact members 15 and 16 are moved in one direction by an armature 17, subject to the influence of an electromagnet 18, and in the opposite direction by a spring 19, the electromagnet being in a circuit derived from the outer circuit 20 21 of the electromechanical accumulator C when the latter is acting as a generator.

The drawing Fig. 2 shows the contacts 9 and 10 connected with the brushes of the motor, this being the connection established when the primary supply A is cut off and the motor is to be run by the electromechanical accumulator. At this time the circuit will be from the upper brush of the accumulator C, by conductor 20, through the electromagnetic clutch 2, thence to contact 10, by movable member 16 and conductor 12 to brush 14, into the motor, and from the motor, by brush 13, conductor 11, movable member 15, contact 9, and conductor 21, to the lower brush of the accumulator-generator. In this way the current furnished by the electromechanical accumulator is delivered to the clutch 2, thereby causing the same to couple the shaft 3 of the translating device I to the motor-shaft, and it is also delivered to the motor to cause the actuation of the latter.

So long as the current delivered by the accumulator acting as a generator is sufficient to energize the magnet 18 adequately to hold the movable members 15 and 16 upon the contacts 9 and 10 the operation will continue as described and the translating device will be put in motion. When, however, as will happen in a short time, the speed of the fly-wheel *e* is so far reduced and the current output of the electromechanical accumulator falls so low that the magnet 18 can no longer hold the members 15 and 16 in contact with the studs 9 and 10, the spring 19 will move said members to the contacts 6 and 8. When this new circuit is established and the circuit 20 21 is broken, the wheel *e* will rotate without load and without resistance other than that of friction, but the clutch 2, being deënergized, will disconnect the motor from the translating device I. The new connection formed will establish a circuit from the battery or primary source A by conductor 4 through clutch 1, conductor 5, contact 6, movable member 15, conductor 11, and brush 13 to the motor and thence by brush 14, conductor 12, movable contact 16, contact 8, and conductor 7 back to the source A. This circuit, including the source A of electric energy, serves not only to deliver the actuating current to the motor, but also to energize the electromagnetic clutch 1 and to couple thereby the motor with the electromechanical accumulator C, whereupon the same cycle of operations explained will again take place.

In Fig. 3 I have represented the same general plan of operation as first above described, except that I have introduced a second electromechanical accumulator C′, with its speeding-motor B′, the parts and the circuits being so arranged that when the fly-wheel of the first electromechanical accumulator C attains its predetermined velocity and the circuits are so changed as to convert it into a generator its output of current is delivered to the motor B′, which speeds the fly-wheel of the second electromechanical accumulator C′, which wheel runs free until its given speed is attained, whereupon the current is switched from the second motor B′, and the accumulator C′, operating as a generator, delivers current to the translating device. By this arrangement the first motor, which possesses relatively little power, stores up through prolonged use a comparatively greater power in the first electromechanical accumulator, which, converting this stored power during a short period into electrical energy, supplies and gives motion to the second motor B′, which, operating for a given period of time, stores up in the fly-wheel of the second accumulator a still higher degree of power than was stored in the first and subsequently converts this for a brief period into electric energy greater than could be produced directly by the first or the second motor acting for a like period of time.

The circuits, switches, contacts, and the like, which in Fig. 3 are the same as in Fig. 1, are lettered the same for convenience, the same parts in the second section of Fig. 3 being marked with an exponent to prevent confusion with those of the first section.

While I have described the apparatus in a form which seems most convenient for ready explanation and in a form which I deem well adapted to the purpose, it is to be understood that I do not restrict myself to such embodiment, nor is it essential that the fly-wheel *e* be provided with coils or windings *f*, since I may make the same a permanent magnet.

As before stated, the character of the translating device is immaterial, and the motor G and apparatus I of Figs. 1 and 2 are merely illustrative or indicative of translating devices in general. It is to be understood that the current is to be employed for any purpose for which it may be found suitable. It is further to be understood that the employment of an electric motor for speeding the electromechanical accumulator, though advantageous, is not essential and that motion may be imparted to said wheel by any suitable means, manually or otherwise. The construction shown and described, however, is thoroughly automatic in its action and is deemed in every way preferable to such manually-operated or to a manually-controlled system, and is hence more than the mere equivalent thereof.

The fly-wheel of the electromechanical accumulator C′ is heavier than that of the accumulator C, and the motor B′ is larger or more powerful than the motor B.

It is of course to be understood that the winding *f*, represented in the drawings for producing poles in the wheel *e*, is merely indicative of any suitable winding and may be varied at will.

The term "fly-wheel" is used in a broad or general sense to indicate and to include any form of rotating body having a reasonable mass or weight and adapted to maintain for a considerable time motion imparted to it. The form may be that of a wheel, disk, cylinder, sphere, or other shape.

Although toothed gearing is indicated as the means of connecting the motor and the accumulator, it is obvious that any well-known or common means of connection or transmission—such as friction-gear, belting, sprocket wheels and chain, or the like—may be employed.

Having thus described my invention, I claim—

1. In an apparatus for storing up and applying energy, the combination of a fly-wheel provided with polarizing-coils; a source of electricity for exciting the fly-wheel; means for imparting rotary movement to said wheel; an armature encircling said wheel; and means for opening and closing the armature-circuit, whereby the wheel is enabled to run free within the armature and without load during the operation of speeding it to a predetermined velocity, and is thereafter caused to coöperate with the armature in the generation of an electric current.

2. In an apparatus for storing and accumulating energy, the combination of a fly-wheel adapted to form one member of an electric generator; an armature provided with coils or windings and encircling said wheel; conductors connected with the terminals of the armature-winding; a translating device connected with said conductors; an electric motor connected with and serving to rotate said wheel; a small electric generator rotatable with said wheel; a source of electric energy serving to supply the motor; a switch adapted to close the supply-circuit of said motor and to open the circuit in which are included the fixed armature coils or windings or to close the latter and open the former; and an electromagnet included in the outer circuit of the small electric generator and serving to actuate said switch.

3. In an apparatus for storing and accumulating energy, the combination of a source of electric energy; a motor in circuit with said source; a fly-wheel geared to said motor and adapted to be speeded thereby; coils or windings carried by said fly-wheel and having their terminals connected with collecting-rings; brushes bearing upon said rings and electrically connected with the motor-brushes; a fixed armature encircling the fly-wheel; a small generator having its armature carried by the shaft of said fly-wheel; a switch or circuit-closer adapted to complete the supply-circuit of the motor and to interrupt the circuit including the coils of the fixed armature, or to close the latter circuit and open the motor-supply circuit; an electromagnet for actuating said switch or circuit-closer, said electromagnet included in the circuit of said small generator; a resistance and electromagnet likewise included in said generator-circuit; a short-circuiting bar or member located within the field of said electromagnet and serving when attracted to short-circuit a portion of said resistance; and a translating device in circuit with the fixed-armature coils.

4. In combination with an electric motor adapted to operate alternately as a motor and a generator, a fly-wheel connected with said motor and adapted alternately to be driven by and to drive the same; windings carried by said fly-wheel; an armature encircling said wheel and serving when its windings are in closed circuit to coact with said wheel to produce an electric generator; and means for alternately closing the motor-supply circuit and opening the armature-coil circuit and for closing the armature-coil circuit and opening the motor-supply circuit.

5. In an apparatus for storing and applying energy the combination of an electric motor actuated by a relatively weak current, an electric generator driven thereby, a fly-wheel associated and revolving with the rotating shaft of the generator and in which is stored energy from said motor, the work-circuit of the generator, an exciting-circuit from the motor to the field of the generator, and means for disconnecting the motor from its source of energy (the motor being then as a generator driven by the fly-wheel) and for closing said work-circuit when the fly-wheel has reached the desired velocity, for the purpose set forth.

6. In an apparatus for storing and applying energy the combination of an electric motor actuated by a relatively weak current, an electric generator driven thereby, a fly-wheel associated and revolving with the rotating shaft of the generator and in which is stored energy from said motor, the work-circuit of the generator, an exciting-circuit for the generator that may receive current from a suitable source, and means for closing said work-circuit for the purpose set forth when the fly-wheel has reached the desired velocity.

7. An apparatus for storing and applying electric energy, comprising an electric motor actuated by a relatively weak current, a generator and associated fly-wheel driven thereby during a relatively long period, and the work-circuit, combined with means for closing the work-circuit when the fly-wheel has reached the desired velocity and means whereby the generator is caused to supply the work-circuit when the latter is closed whereby the energy from the fly-wheel is delivered as electrical energy in the work-circuit of the generator during a relatively short period.

8. The combination of an electric motor adapted to run at times as a generator, a source of electricity for energizing the motor, a fly-wheel associated with the motor and driven up to a predetermined speed thereby, means for disconnecting the motor from its energizing-circuit and causing it to be rotated for a time by the fly-wheel and for again connecting the motor with its energizing-circuit when the speed of the fly-wheel has diminished, and a circuit-receiving current when the motor is run as a generator.

In testimony whereof I have signed my name to this specification in the presence of two subscribing witnesses.

ANGEL DE CASTRO.

Witnesses:
WILLIAM W. DODGE,
W. CLARENCE DUVALL.